United States Patent [19]

Howard

[11] Patent Number: 4,761,808
[45] Date of Patent: Aug. 2, 1988

[54] TIME CODE TELEPHONE SECURITY ACCESS SYSTEM

[76] Inventor: Sheldon Howard, 2510 S. Mountain Brook Dr., Hacienda Heights, Calif. 91745

[21] Appl. No.: 27,336

[22] Filed: Mar. 18, 1987

[51] Int. Cl.$^4$ ............................................. H04M 11/00
[52] U.S. Cl. ..................................... 329/95; 379/112; 379/97
[58] Field of Search ............... 379/112, 418, 361, 189, 379/95, 97

[56] References Cited

U.S. PATENT DOCUMENTS 4,546,213  8/1985  Dick ........................................ 379/95
4,626,623  12/1986  La Haye ................................ 379/95

OTHER PUBLICATIONS

Automated Patent System, Database Specification Access Control, May 11, 1985, p. 3-2 of APS-DP-S-0601.01.
Automated Patent System, Program Specification Access Control, May 1, 1985, APS-CPS-0601.01, pp. 4-74, 4-75.

Primary Examiner—Stafford D. Schreyer
Attorney, Agent, or Firm—Blakely, Sokoloff, Taylor & Zafman

[57] ABSTRACT

The present invention comprises a novel means of controlling access to long distance telephone services or other information processing systems through the use of time dependent user ID numbers. The ID number of the present invention contains a fixed portion, and a changing portion that changes over time in a predetermined manner. Unless the fixed and changing portions of an incoming ID number received from a user attempting to gain access to the secured system are both correct, access is denied. The invention also includes a multi-use detector that determines if a valid ID number is used simultaneously by two different users.

18 Claims, 2 Drawing Sheets

| TIME | PRIOR ART<br>A A A A A A A | EMBODIMENT I<br>A A A A A $T_1$ $T_2$ | EMBODIMENT II<br>A A $T_1$ A A $T_2$ A |
|---|---|---|---|
| $t_0$ | 2 2 2 2 2 2 2 | 2 2 2 2 2 6 7 | 2 2 6 2 2 7 2 |
| $t_1$ |  | 2 2 2 2 2 4 1 | 2 2 4 2 2 1 2 |
| $t_2$ |  | 2 2 2 2 2 2 3 | 2 2 2 2 2 3 2 |
| $t_3$ |  | 2 2 2 2 2 5 8 | 2 2 5 2 2 8 2 |
| $t_4$ | NO CHANGE | 2 2 2 2 2 1 9 | 2 2 1 2 2 9 2 |
| . | . | . | . |
| . |  | . | . |
| $t_f$ |  | 2 2 2 2 2 4 7 | 2 2 4 2 2 7 2 |
| $t_{f+1}$ |  | 2 2 2 2 2 6 7 | 2 2 6 2 2 7 2 |

| | PRIOR ART<br>A A A A A A A | EMBODIMENT I<br>A A A A A $T_1$ $T_2$ | EMBODIMENT II<br>A A $T_1$ A A $T_2$ A |
|---|---|---|---|
| TIME | | | |
| $t_0$ | 2222222 | 2222267 | 2262272 |
| $t_1$ | | 2222241 | 2242212 |
| $t_2$ | | 2222223 | 2222232 |
| $t_3$ | No Change | 2222258 | 2252282 |
| $t_4$ | | 2222219 | 2212292 |
| . | | . | . |
| . | | . | . |
| $t_f$ | | 2222247 | 2242272 |
| $t_{f+1}$ | | 2222267 | 2262272 |

*Fig. 1*

| TIME | $T_1 T_2$ |
|---|---|
| $t_0$ | 67 |
| $t_1$ | 41 |
| $t_2$ | 23 |
| $t_3$ | 58 |
| $t_4$ | 19 |
| $t_5$ | 86 |
| $t_6$ | 29 |
| . | . |
| . | . |
| $t_f$ | 47 |

*Fig. 2*

| PATTERN CODE | PATTERN | ID NUMBER ($t=t_0$) |
|---|---|---|
| 1 | A A A A A $T_1$ $T_2$ | 2222267 |
| 2 | A A $T_1$ A A $T_2$ A | 2262272 |
| 3 | A $T_2$ A A $T_1$ A A | 2722622 |
| 4 | A $T_1$ A A A $T_2$ A | 2622272 |
| 5 | A $T_2$ $T_1$ A A A A | 2762222 |
| 6 | A A $T_2$ A $T_1$ A A | 2272622 |
| 7 | A A $T_1$ $T_2$ A A A | 2267222 |
| 8 | A A A $T_1$ $T_2$ A A | 2226722 |
| 9 | A A A $T_1$ A A $T_2$ | 2226227 |

*Fig. 3*

TIME CODE TELEPHONE SECURITY ACCESS SYSTEM

BACKGROUND

1. Field of the Invention

The present invention relates to security code identification systems for long distance telephone services and, more specifically, to an identification system using codes that are user and time dependent.

2. Prior Art

Over the past few years, a large number of long distance telephone companies have appeared to compete in the long distance telephone services market. Typically, subscribers of these services are each issued a unique seven or eight digit identification code that allows them access to a particular service. To use the service, a subscriber usually calls a local telephone number, enters that subscriber's individual identification code (usually using the "touch-tones" of a conventional telephone), and then dials the desired telephone number. Automated equipment reads the sequence of tones generated and if the identification number ("ID number") corresponds to a number validly issued to a subscriber, the proper telephone connection is made. The telephone call is then billed to the owner of the ID number used. Depending on what type of service is provided, the subscriber may be charged on a conventional time/distance basis for each telephone call, or the subscriber may be charged at a fixed monthly or other periodic rate.

A major convenience feature for subscribers is that any telephone within a service area (which, in some cases, includes the entire United States) can be used to make long distance calls for the cost of a local phone call, the long distance costs being charged to their separate account and billed later. Long distance calls can be made from public pay telephones without incurring operator assisted rates or requiring substantial amounts of change, and calls can be made by a subscriber from a third person's private or business phone without charging the third person's account.

A major disadvantage of using tone-based ID numbers is that anyone knowing or discovering a valid ID number can use that ID number to make telephone calls at either the service operator's or the subscriber's expense. Such fraudulent use of an ID number takes two predominant forms.

The first arises where the subscriber buys an unlimited amount of telephone time at a flat periodic rate. In this kind of arrangement, the service owner usually sets the flat rate according to a statistically calculated average amount of telephone use for a particular kind of subscriber and the service owners own cost for long distance lines. What often happens, however, is that the subscriber, since he is paying a fixed, flat rate, distributes the ID number to friends, family and acquaintances to allow them to use the subscriber's long distance service without charge. As a result, the amount of telephone usage that occurs on the subscriber's account is much greater than anticipated by the service owner, eroding the owner's profit or even forcing the owner to take a loss.

A second form of telephone ID number fraud occurs where a non-subscriber discovers a subscriber's ID number and uses that ID number to make telephone calls that are billed to the subscriber. Often a computer is used to generate and test different ID numbers until one or more numbers are found that gain access to the service. The subscriber is usually unaware that someone else is using the subscriber's number until the subscriber receives the resulting bill. By that time, the fraudulent user may have switched to a new ID number. If the fraudulent user uses public telephones to place the unauthorized calls, the fraudulent user can usually not be easily identified.

Several security access systems have been proposed to overcome the problem of unauthorized ID number use.

One such system involves the use of autodialers in which the ID number is not revealed to the user but is stored in the memory of an autodialer. To access the service, a subscriber holds the autodialer to the mouthpiece of a telephone and presses a button. The autodialer then emits the sequence of tones representing the subscriber's ID number. Although this security system makes it more difficult for a subscriber to share that subscriber's ID number with others, this security system can still be defeated by recording the tones on an ordinary cassette recorder and playing them back into a telephone. Alternatively, the autodialer can be played into any number of commercially available decoding devices to discover the ID number. Furthermore, use of an autodialer does not prevent the use of a computer to randomly generate numbers to discover operable ID numbers for fraudulent use.

A second security system makes use of tones that are not ordinarily found on conventional touch-tone telephones. The tones used on touch-tone telephones are standardized tones known as "Dual-Tone Multi-Frequency", or DTMF. The DTMF scale has 16 separate tones, only 12 of which can be generated by conventional telephones. By incorporating the additional tones in the ID number (and using an autodialer to produce the required tones), ordinary telephones can no longer be used for unauthorized access to the telephone service. However, the tones can still be tape recorded or generated by a computer.

SUMMARY OF THE PRESENT INVENTION

The present invention comprises an ID number security access system that overcomes the disadvantages of the prior art. Instead of using ID numbers that remain constant over time for each individual, the ID number of the present invention changes in a predetermined fashion.

The ID number used in the present invention has two parts: a fixed part unique to each subscriber; and a time-based part that changes at periodic intervals in a predetermined fashion. Both the fixed part and changeable parts of the ID number are stored in the memory of an autodialer, which is also provided with a clock chip. When the subscriber operates the autodialer, the autodialer retrieves the changeable portion of the ID number that corresponds, in a predetermined manner, to the time indicated by the clock chip. The autodialer combines the changeable portion with the fixed portion in a predetermined order, and emits the tones corresponding to the resulting ID number. A computer receiving the tones decodes them, and compares the fixed and changing portions of the resulting ID number to fixed and changing portions retrieved from its own memory. Only if both the fixed portion and the changing portion of the ID number received by the computer corresponds exactly to fixed and changing portions retrieved from the computer's memory, is access allowed to the long distance service.

The invention also includes a multi-use detector, which detects the simultaneous use of a valid ID number by more than one user.

BRIEF DESCRIPTION OF THE DRAWINGS

FIG. 1 is a table illustrating the change in ID numbers over time in two embodiments of the present invention and a typical prior art embodiment.

FIG. 2 is a table illustrating examples of the time codes of the present invention.

FIG. 3 is a table illustrating various patterns that can be used to combine the time code and address code portions of the ID number of the present invention.

DETAILED DESCRIPTION OF THE INVENTION

Figure 4:
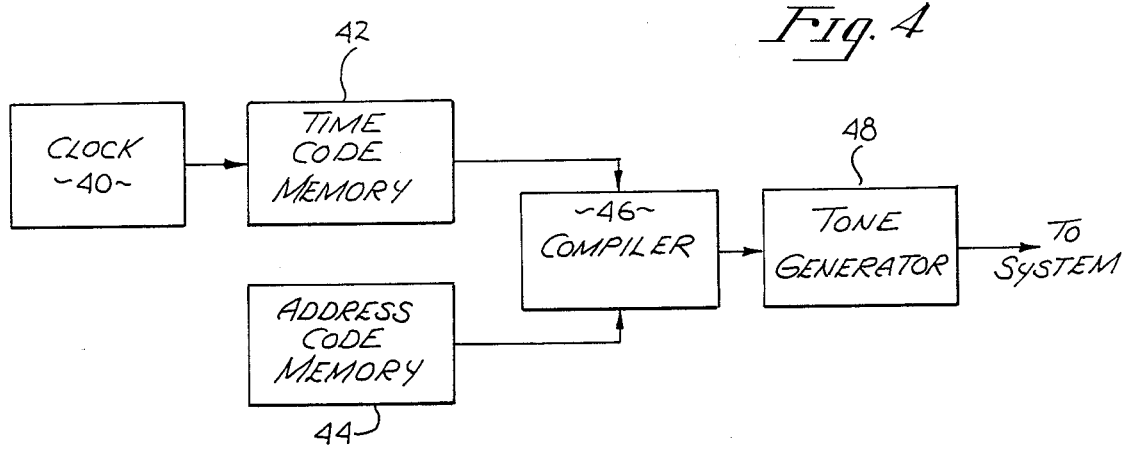
FIG. 4 is a schematic diagram of a remote or sending terminal of one embodiment or the present invention.

An improved security access system for telephone services is disclosed. In the following description, for purposes of explanation, numerous details are set forth, such as specific numbers of digits, arrangements and sequencing patterns in order to provide a thorough understanding of the present invention However, it will be apparent to one skilled in the art that the invention may be practiced without these specific details. In other instances, well-known components, such as autodialers, clock chips and computer memories have not been described in detail in order not to obscure the present invention unnecessarily.

In the present invention, a autodialer is used to generate tone-based security access ID codes. The tone scale used is the conventional Dual-Tone Multi-Frequency ("DTMF") system. Each ID code has two portions: a fixed portion, or "address code" and a varying portion, or "time code". The address code is used to identify the subscriber, while the time code and the address code together are used to protect against unauthorized use.

FIG. 1 illustrates the differences between the ID codes of the present invention and prior ID code systems. In prior art systems, the ID code is a fixed number, unchanging over time, that is unique to each subscriber. This number may have any number of digits. The ID code of the prior art shown in Column 1 of FIG. 1 consists of the seven digit number "2222222". Although only the digits 0 through 9 are used in the examples, the remaining tones of the DTMF system, namely #, *, A, B, C & D may also be used. For a seven digit number using the characters 0-9, there are 10 million possible codes. By usinq the six additional characters listed above, the number of possible codes increases to nearly 270 million.

One embodiment ("Embodiment I") of the ID codes used in the present invention is illustrated in Column 2 of FIG. 1. In this case, the ID code, like in the prior art case of Column 1, is a seven digit number. However, only five of these digits are fixed. These fixed digits will be referred to collectively as the "address code" and individually as "A's". The two remaining numbers change according to a predetermined sequence with time. These digits will be referred to collectively as the "time code" and individually as "$T_1$" and "$T_2$".

One example of how the time code of Embodiment I can change over time is demonstrated by FIG. 2. FIG. 2 contains a list of randomly selected two digit numbers $T_1T_2$, each one corresponding to a different time t. For instance, at time $t_0$, $T_1T_2$ is equal to 67. At time $t_1$, $T_1T_2$ changes to 41, at $t_2$ to 23, and so on. It is preferred that the time interval $\Delta t$ between successive changes is constant throughout, although varying $\Delta t$'s may also be used. A typical size for $\Delta t$ is on the order of 10 minutes, although much smaller or much greater $\Delta t$'s can be used.

The advantages of using a time code will be apparent by comparing Columns 1 and 2 in FIG. 1. The prior art ID code, shown in Column 1, does not change over time. A person using a computer to find a valid ID code can, therefore, simply by trial and error, eventually discover a valid ID number that will allow that person access to the service. Although it may take an extensive amount of time to discover such a valid number, such investment of time is worthwhile because once a valid ID number is discovered, that number can be used again and again.

If the ID number contains the time code of the present invention, however, once a valid ID code is discovered, that number will only be usable for a very limited period of time, namely, at most, for $\Delta t$. Because the ID code as a whole still contains seven digits, the number of possible codes is the same if a time code is incorporated in the ID number as if only fixed address codes were used. The investment of time to discover a valid code will be equally as large in both cases. However, the gain produced by this investment of time in the present invention is significantly less than in prior art ID number systems because the discovered ID number will only be valid for a limited period of time. This decreased return on invested time will tend to discourage unauthorized users from investing time and energy to break into the system.

Figure 5:
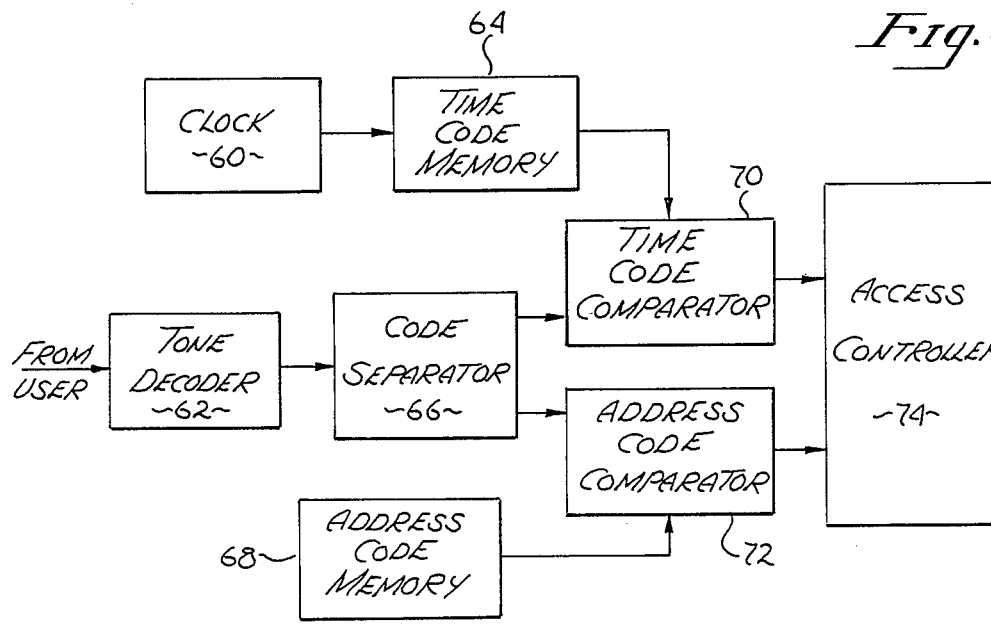
FIG. 5 is a schematic diagram of the base or receiving terminal of one embodiment of the present invention.

FIGS. 4 and 5 show schematically the components of one embodiment of a security access system using the time based ID code of the present invention. FIG. 4 illustrates a remote terminal, such as an autodialer, that is issued to each authorized subscriber of the service. FIG. 5 illustrates a base terminal that receives the ID codes from the remote terminals and which controls access to the service.

The remote terminal comprises five main components: a clock 40, a time code memory 42, an address code memory 44, a compiler 46, and a tone generator 48. It operates as follows.

Upon activation of the unit (for instance, by pushing a button on the autodialer), the appropriate time code, based on the time indicated by the clock 40, is selected from a list of time codes contained in the time code memory 42. An example of such a list is illustrated in FIG. 2. FIG. 2 contains a sequence of randomly selected two digit time codes $T_1T_2$ each corresponding to a different time $t_n$. For example, between $t_o$ and $t_1$, $T_1T_2$ equals 67, between $t_1$ and $t_2$, $T_1 T_2$ equals 41, and so on. The list contains a finite number of time codes, which, in the case of a typical ROM memory chip, might be 8000. Once the end of the list is reached at time $t_f$ (which, for a list of 8000 numbers and a $\Delta t$ of 10 min., will be every 80,000 minutes, or about every 56 days), the sequence of time codes starts again from the beginning of the list.

At approximately the same time as the time code is being selected from the time code memory 42, the address code is read from the address code memory 44, which may be a physically separate memory unit from time code memory 42, or both memories may simply be portions of a single memory unit. The time code and address code digits are then strung together in a predetermined order by the compiler 46. The resulting alphanumeric ID code is transformed by the tone generator 48 into corresponding DTMF tones, producing a tone code. This tone code is sent over telephone or other audio communication means to the base terminal to obtain access to the long distance service.

In some cases, if an older telephone is being used, the carbon microphone element of the telephone may have deteriorated to the extent that the tones generated by the autodialer are not accurately transmitted to the base terminal. In such cases it would be desirable for an authorized user to be able to manually enter the current ID code using the push-buttons of the telephone, thereby bypassing the carbon element. The autodialer may therefore be equipped with a digital readout, such as a liquid crystal display, that, upon activation of the autodialer, displays the current ID code. The user can then read off the ID code from the display and manually push the appropriate telephone buttons (in such case, however, only the 12 DTMF codes found on conventional telephones can be used).

The tone generator may even be eliminated from the remote terminal altogether, allowing the creation of a credit card size unit for generating and displaying the proper ID code, but requiring manual ID code entry.

The base terminal receives the tone code, decodes it and determines the validity of the resulting ID code. Referring to FIG. 5, the base terminal in one embodiment comprises a tone decoder 62, a code separator 66, a clock 60, a time code memory 64, an address code memory 68, a time code comparator 70 and an address code comparator 72. Incoming tone codes are received by the tone decoder 62, which decodes the tones into a corresponding alphanumeric ID code. The resulting ID code is divided into address code and time code components by the code separator 66. The address code component is compared to a list of valid address codes contained in the base terminal's address code memory 68. The time code portion is compared to the appropriate time code selected, according to the time indicated by clock 60, from the remote terminals time code memory 64. Only if both parts of the ID code are valid does the access controller 74 allow the caller access to the service.

In the simplest embodiment of the present system, the time code sequence for all subscribers is the same. Thus, the base terminal time code memory 64 contains the same sequence of time codes as the time code memory 42 of each of the remote terminals, and the time code is selected in the same fashion in both the remote and the base terminals.

The address code digits ("A's") and time code digits ("T's") may be compiled in any desired pattern, two of which are illustrated in FIG. 1. In embodiment I, the pattern is $A-A-A-A-A-T_1-T_2$, while in embodiment II, the pattern is $A-A-T_1-A-T_2-A$.

Although the time codes are hidden in the autodialer's ROM memory, it is conceivable that an unauthorized user could obtain an autodialer and copy the autodialer's time code sequence from its time code memory. If the same time code sequence is used for all subscribers, knowing this time code sequence would reduce the effort required by the unauthorized user to find a usable ID number, since the unauthorized user would only have to determine the remaining address code digits.

A second embodiment of the present invention includes the improvement of using different patterns for combining the address and time codes for different subscribers. FIG. 3 shows examples of different patterns that might be used. In this embodiment, each subscriber is assigned a pattern based on the first digit of the subscriber's address code. For example, if a subscriber's address code is "86243", the subscriber would use the pattern corresponding to the digit "8". In FIG. 3, this pattern would be $A-A-A-T_1-T_2-A-A$. To decode an incoming signal in this embodiment, the code separator would contain a list of available patterns, and would separate the incoming ID code according to the pattern that corresponds to the incoming ID code's first digit. If an incoming ID code received by the base terminal uses the right digits but in the wrong order, invalid address and time codes as decoded by the base terminal would result, and access to the service would be denied. Other methods of assigning patterns may also be used.

Figure 6:
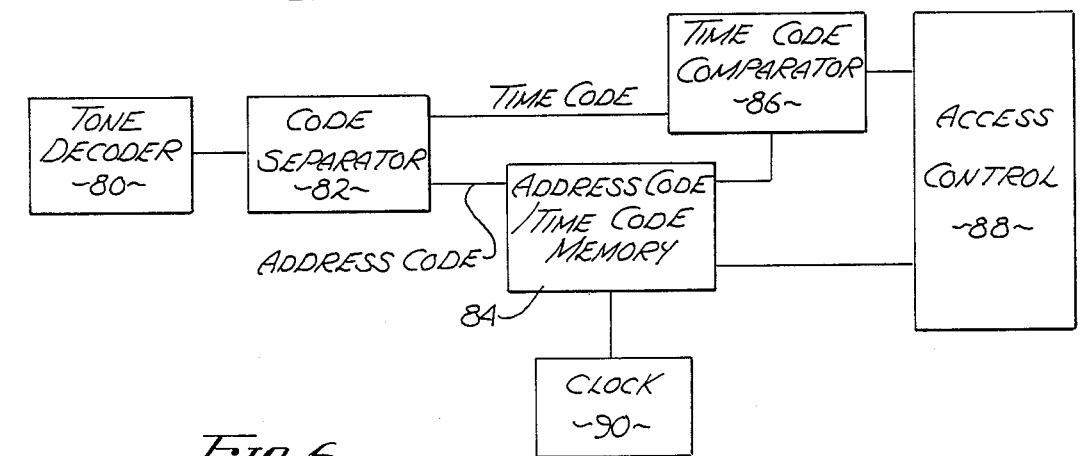
FIG. 6 is a schematic diagram of the base terminal of a second embodiment of the present invention.

A further improvement found in the preferred embodiment of the present invention, is the use of a unique time code sequence for each subscriber. In this embodiment, rather than having separate time code and address code memories or memory sections, the base terminal has a combined address and time code memory in which the time code sequence for each authorized subscriber is stored according to the address code of a subscriber. Referring to FIG. 6, the incoming tone code is decoded into an alphanumerical ID code by tone decoder 80. Code separator 82 divides this ID code into address and tone code portions. The address code portion is sent to the address code/time code memory 84. If the address code is invalid, there will be no time code sequence stored for that address code and a signal is sent to the access control 88 to deny access to the service. If the address code is valid, the appropriate time code is selected from the time code sequence stored under that address code according to the time indicated by clock 90. This time code is then compared to the incoming time code by time code comparator 86. If the two time codes are not identical, a signal is sent to access control 88, and access is denied. Because the time codes at any one time will be different for each subscriber, if an unauthorized user discovered the time code sequence corresponding to one address code, that knowledge would be useless with respect to other address codes. To be able to effectively defeat the security system, the unauthorized user would have to discover all possible time sequences. Short of gaining acess to the base terminals memory, such an endeavor is nearly impossible.

In addition to having a unique time code sequence, each remote terminal may also use a different time code rate of change, further increasing the difficulty of gaining unauthorized use of the service. The time interval between consecutive time codes need not be constant, but may change according to a predetermined pattern. The ID code number may also contain two or more independent time codes, which change at the same or different rates.

In addition to changing time codes and changing patterns, the present invention incorporates two other security features.

The first, the Multi-Use Detector, detects when the same ID number is used simultaneously by more than one user. Since each legitimate user has a unique ID code, such multiple use indicates that there is at least one unauthorized use in progress. The legitimate user's ID code is then changed, and the unauthorized user must start anew. Such a Multi-Use Detector, which can form part of the base terminal, may, for example, consist of a temporary memory register in which a subscriber's address code is stored during the time the subscriber is actually using the service. The address code portion of any incoming ID code is then compared to the address codes stored in the temporary memory register, and if there is a match, that particular address code is flagged as being subject to unauthorized use. The ID code of the subscriber can then be immediately changed.

The second additional security feature, effective primarily when autodialers are used to generate the tone codes, is a tone code duration timer that denies access if the time it takes to receive an incoming tone code signal is greater than a predetermined maximum value. Such a timer can consist of a clock that is triggered by the first tone of an incoming tone digit. If the required number of digits is not received prior to the expiration of the preset time, the timer sends a signal to the access control unit of the base terminal, and access to the service is denied. This feature is especially useful for detecting the use of manual touch tone phones to enter the service. Since autodialers can "dial" much more quickly than a person using a touch-tone phone, the maximum sending time can be set small enough to make it physically impossible to access the system using a push-button phone.

Accordingly, an improved security access code system for a long distance telephone service has been presented. The invention provides a level of protection against unauthorized entry that was not possible with the prior art. Although specific details are described herein, it will be understood that various changes can be made in the materials, details, arrangements and proportions of the various elements of the present invention without departing from the scope of the invention. For example, although the specification refers primarily to a five digit address code and a two digit time code, any number of address code or time code digits can be used. The ID number may exist entirely of a time code, a time code and a pattern code, or any length of time codes and address codes. The ID number need not be coded into tones, and the security access code system may be used with data bases, computing systems, or other security installations in addition to being used for long distance telephone services. The time codes and address codes of the present invention can be combined in other ways than alternating digits. For instance, the time and address codes may be added or multiplied together. Other uses and variations will be apparent to those skilled in the art.

I claim:

1. A security access control system for controlling access of users to an information processing system, said security access control system comprising:
   a plurality of remote terminals each comprising a signal generating means for generating a coded identification signal and a transmitting means for transmitting said coded identification signal;
   a base terminal comprising a receiving means for receiving said coded identification signals, a signal processing means for decoding and determining the validity of each of said coded identification signal, and an access control means for controlling access to said information processing system;
   each of said coded identification signals generated by said signal generating means of said remote terminal comprising a sequence of a predetermined number of alphanumeric digits, a first group of said alphanumeric digits comprising a time code and a second group of said alphanumeric digits comprising an address code;
   said time code changing periodically in a predetermined manner;
   said address code remaining essentially constant over time;
   each of said signal generating means comprising a first time code memory means containing a first predetermined sequence of time codes, and a first clock means for selecting a first time code from said first sequence of time codes contained in said first time code memory means;
   said signal processing means of said base terminal comprising a second time code memory means containing a second predetermined sequence of time codes and a second clock means; and
   said signal processing means further comprising first comparator means for comparing said time code component of said incoming identification signal with a second time code selected according to the time indicated by said second clock means from said second time code memory means;
   whereby said base terminal denies access to said information processing system if said time code component of said incoming identification signal and said second time code are not identical.

2. The security access control system of claim 1 wherein:
   each of said signal generating means further comprises a first address code memory means containing a unique first address code; and
   said signal processing means further comprises a second address code memory means containing a plurality of address codes including said first address codes of each of said remote terminals and a second comparator means for comparing said address code component of said incoming identification signal to said plurality of address codes contained in said second address code memory means;
   whereby said base terminal denies access to said system if said address code component of said incoming identification signal is not identical with at least one of said plurality of address codes contained in said second address code memory means.

3. The security access control system of claim 1 wherein each of said first sequences of time codes contained in each of said first time code memories of each of said remote terminals are identical to each other and to said second sequence of time codes contained in said second time code memory of said base terminal.

4. The security access control system of claim 2 wherein each of said first sequences of time codes contained in each of said first time code memories of each of said remote terminals differ from each other, and wherein said second time code memory means contains each of said first sequences of time codes of each of said remote terminals, each of said first sequences of time codes being identified in said second time code memory means by the address code of the corresponding remote terminal.

5. The security access control system of claim 2 wherein said base terminal further comprises a multiple use detector, said multiple use detector comprising an in-use register means and an in-use comparator means, said in-use register means containing the address codes which, at any point in time, are being used to access said system, said in-use comparator means for comparing the address code portion of an incoming identification signal to the address codes contained in said in-use register, such that any address code being used simultaneously by two or more users can be detected.

6. The security access control system of claim 1 wherein said transmitting means comprises a tone generator, said tone generator for transforming said sequence of alphanumeric digits of said identification signal into a corresponding sequence of tones; and wherein said receiving means comprises a tone decoder for transforming said sequence of tones into the corresponding sequence of alphanumeric digits;

whereby said coded identification code can be transmitted as an audio signal by conventional audio communications means.

7. The security access control system of claim 6 wherein said receiving means further comprises a timer means for measuring the time between reception by said receiving means of the first and last tones of said sequences of tones received by said receiving means.

8. The security access control system of claim 1 wherein said signal generating means comprises a display means for visually displaying said coded identification signal.

9. The security access control system of claim 1 wherein said transmitting means comprises a telephone.

10. A method for verifying the authenticity of incoming identification signals received by an access control means of a secured information processing system to prevent access by unauthorized users to said system, said verification method comprising the steps of:

providing each of a plurality of authorized users of said system with a unique, multi-digit alphanumeric address code;

providing each of said authorized users with a predetermined sequence of multi-digit alphanumeric time codes, each time code corrresponding to different period of time;

providing each of said authorized users with a means for combining said address code and said time code in a predetermined pattern;

dividing an incoming identification signal into time code portions and address code portions corresponding to said predetermined patterns;

comparing said address code portion of said incoming identification signal to a list of valid address codes of authorized users;

rejecting said incoming identification signal as invalid if said address code portion of said incoming identification signal is not identical to any of said valid address codes;

comparing said time code portion of said incoming identification signal to the time code corresponding to the time at which said incoming identification signal is received; and rejecting said incoming identification signal as invalid if said time code portion of said incoming identification signal is not identical to said corresponding time code.

11. The verification method of claim 10 wherein each authorized user is provided with identical sequences of time codes.

12. The verification method of claim 10 wherein each authorized user is provided with a different sequence of time codes.

13. The verification method of claim 10 wherein said predetermined pattern for combining said address codes and said time codes is the same for all authorized users and remains constant over time.

14. The verification method of claim 10 wherein said predetermined pattern for combining said address codes and said time codes for each authorized user is selected from a predetermined set of patterns such that the same pattern is not used by all authorized users.

15. The verification method of claim 14 wherein for each authorized user said predetermined pattern for combining said address codes and said time codes remains constant over time.

16. The verification method of claim 14 wherein, for each authorized user, said predetermined pattern for combining said address code and said time codes changes over time in a predetermined manner.

17. The verification method of claim 10 further comprising the steps of:

measuring the length of time it takes to receive an incoming identification signal from the time of receipt of the first digit of said incoming signal to the time of receipt of the last digit of said incoming signal;

comparing said length of time to a predetermined maximum allowable value of such length of time; and denying access to said secured system is said length of time exceeds said maximum allowable value.

18. The verification method of claim 10 further comprising the steps of:

maintaining a list of all address codes of all users who are at any period of time accessing said secured system;

comparing the address code of any incoming identification signal to said list of address codes; and identifying any address code that is used simultaneously by two or more different users.

* * * * *